(12) United States Patent
Burgess (10) Patent No.: US 6,931,794 B1
(45) Date of Patent: Aug. 23, 2005

(54) METHOD AND APPARATUS FOR INSTALLING FITTING

(76) Inventor: John David Tilbury Burgess, P.O. Box 420, Kings Cross, New South Wales (AU), 2011

( * ) Notice: Subject to any disclaimer, the term of this patent is extended or adjusted under 35 U.S.C. 154(b) by 431 days.

(21) Appl. No.: 10/088,819

(22) PCT Filed: Sep. 22, 2000

(86) PCT No.: PCT/AU00/01178

§ 371 (c)(1),
(2), (4) Date: May 16, 2002

(87) PCT Pub. No.: WO01/21908

PCT Pub. Date: Mar. 29, 2001

(30) Foreign Application Priority Data

Sep. 22, 1999 (AU) .............................. QA2990

(51) Int. Cl.$^7$ .............................................. E04F 13/06
(52) U.S. Cl. .................. 52/27; 52/39; 52/95; 52/220.1; 52/220.6; 52/741.1; 220/3.2; 174/50; 174/52; 174/56; 174/48; 174/68.1; 248/27.1; 248/906
(58) Field of Search .................. 52/27, 220.1, 741.1, 52/39, 220.6, 95; 174/50, 52, 56, 48, 68.1; 220/3.2; 248/906, 27.1

(56) References Cited

U.S. PATENT DOCUMENTS

| | | | | |
|---|---|---|---|---|
| 1,113,092 A | * | 10/1914 | Beugler ...................... | 220/3.5 |
| 1,963,951 A | * | 6/1934 | Bowers ...................... | 220/3.92 |
| 1,975,690 A | * | 10/1934 | Harrington et al. ........... | 40/580 |
| 2,100,928 A | * | 11/1937 | Way .............................. | 16/358 |
| 2,218,731 A | * | 10/1940 | Tuck et al. .................. | 362/309 |
| 2,282,384 A | * | 5/1942 | Schenck ...................... | 312/7.1 |
| 2,788,187 A | * | 4/1957 | Cookson et al. ........... | 248/27.1 |
| 3,197,549 A | * | 7/1965 | Good ........................... | 174/66 |
| 3,697,742 A | * | 10/1972 | Bobrick ...................... | 362/366 |
| 3,700,885 A | * | 10/1972 | Bobrick ...................... | 362/366 |

(Continued)

FOREIGN PATENT DOCUMENTS

| | | |
|---|---|---|
| DE | 2941-905 | 4/1981 |
| DE | 3310-138 | 10/1984 |
| EP | 786846 | 7/1997 |
| GB | 2 311 174 | 9/1997 |
| WO | WO 94/03951 | 2/1994 |
| WO | WO 99/35726 | 7/1999 |

*Primary Examiner*—Carl D. Friedman
*Assistant Examiner*—Christy Green
(74) *Attorney, Agent, or Firm*—Tucker Ellis & West LLP (57) ABSTRACT

A framing device or support member (1) for framing a fitting, such as a power point or switch (8), within orifice (4) provided in a surface member (3). The device/member is provided with a lip (5) on the extremity thereof which enables a layer of settable material (6) to be applied thereto. A cover plate (9), provided on said fitting (8), is neatly shaped to fit within the framing device/member (1). A substantially smooth and flush surface is formed between the settable material (6) outside the framing device (1) and the cover plate (9).

23 Claims, 6 Drawing Sheets

U.S. PATENT DOCUMENTS

| | | | | |
|---|---|---|---|---|
| 3,872,296 A | * | 3/1975 | Cohen et al. | 362/366 |
| 4,053,082 A | * | 10/1977 | Ullman | 220/3.6 |
| 4,175,281 A | * | 11/1979 | Lonseth | 362/148 |
| 4,209,660 A | * | 6/1980 | Flachbarth et al. | 174/48 |
| 4,226,393 A | * | 10/1980 | Rardin et al. | 248/27.3 |
| 4,250,540 A | * | 2/1981 | Kristofek | 362/368 |
| 4,274,615 A | * | 6/1981 | Chan et al. | 248/343 |
| RE31,409 E | * | 10/1983 | Crist | 312/242 |
| 4,410,155 A | * | 10/1983 | Wetterhorn et al. | 248/27.1 |
| 4,431,151 A | * | 2/1984 | Schonasky | 248/27.1 |
| 4,475,147 A | * | 10/1984 | Kristofek | 362/148 |
| 4,572,923 A | * | 2/1986 | Castellani et al. | 174/48 |
| 4,645,089 A | * | 2/1987 | Horsley | 220/3.6 |
| 4,685,035 A | * | 8/1987 | Nanjoh | 361/829 |
| 4,729,074 A | | 3/1988 | Steadman | |
| 4,777,772 A | * | 10/1988 | Ritzl | 52/208 |
| 4,862,332 A | * | 8/1989 | Hardy | 362/145 |
| 4,909,405 A | * | 3/1990 | Kerr, Jr. | 220/3.9 |
| RE33,305 E | * | 8/1990 | Thayer | 439/560 |
| 5,045,984 A | * | 9/1991 | Trowbridge et al. | 362/365 |
| 5,169,097 A | * | 12/1992 | Yasukawa | 248/27.1 |
| 5,273,243 A | * | 12/1993 | Abdallah et al. | 248/27.1 |
| 5,309,342 A | * | 5/1994 | Heinen, Sr. | 362/364 |
| 5,338,255 A | * | 8/1994 | Akehurst | 454/292 |
| 5,388,795 A | * | 2/1995 | Struthers et al. | 248/231.9 |
| 5,423,499 A | * | 6/1995 | Webb | 248/27.1 |
| 5,448,011 A | | 9/1995 | Laughlin | |
| 5,449,859 A | * | 9/1995 | Bordwell | 174/48 |
| 5,465,199 A | * | 11/1995 | Bray et al. | 362/364 |
| 5,478,032 A | * | 12/1995 | Miller | 248/27.1 |
| 5,482,232 A | * | 1/1996 | Wynn et al. | 248/27.1 |
| 5,494,244 A | * | 2/1996 | Walton | 248/27.1 |
| 5,542,859 A | * | 8/1996 | Ison et al. | 439/536 |
| 5,590,858 A | * | 1/1997 | Bourassa et al. | 248/27.1 |
| 5,609,414 A | * | 3/1997 | Caluori | 362/366 |
| 5,779,197 A | * | 7/1998 | Kim | 248/27.1 |
| 5,823,482 A | * | 10/1998 | Gretz | 248/27.1 |
| 5,895,016 A | * | 4/1999 | Blackburn | 248/27.1 |
| 5,909,008 A | * | 6/1999 | Pelaez | 174/138 G |
| RE36,908 E | * | 10/2000 | Ling | 362/297 |
| 6,179,253 B1 | * | 1/2001 | Cotton | 248/27.1 |
| 6,209,836 B1 | * | 4/2001 | Swanson | 248/300 |
| 6,336,613 B1 | * | 1/2002 | Roth | 248/27.1 |

* cited by examiner

METHOD AND APPARATUS FOR INSTALLING FITTING

TECHNICAL FIELD OF THE INVENTION

The present invention relates to a method and apparatus for installing a fitting in an aperture, and in particular, to that which is suitable for installing fittings such as power points and switch plates.

DESCRIPTION OF THE PRIOR ART

The Applicant of the present invention has hereinbefore proposed methods and apparatus for provision of apertures in building board materials, such as in ceilings and/or walls, and, in particular, the use of such apertures for installation of light fittings, particularly recess light fittings. Details of those methods and apparatus are provided in the Applicant's International Application No. PCT/AU99/00696, published as Publication No. WO00/12840, the contents of which should be considered to be entirely incorporated herein by this reference thereto.

Whilst the Applicant's previous specification particularly related to the method and apparatus for installation of an aperture edging member, a support member for supporting a fitting, a recessed lighting device, etc., whereby such fitting was installed in a manner whereby no visual disruption is caused to the smooth surface of the wall or surface, the Applicant has now conceived various improvements and modifications to the earlier device. The device of the present invention is particularly suitable for installation of power points, switchplates and other like fittings, whereby a cover plate which is associated with the support member and fitting is formed in a manner such that it is substantially flush with or recessed relatively to, a surface finish of the surface member.

SUMMARY OF THE INVENTION

The present invention seeks to provide an apparatus and method capable of forming a substantially smooth surface between a cover plate of a fitting, and the surface finish of a surface member in which the fitting is installed.

In one broad form, the present invention provides a framing device for framing a fitting provided within a surface member, the framing device being formed as a unity member of complementary shape to fit within the entire periphery of an orifice formed within said surface member, the framing device including:
  securement means, the securement of said framing device to said surface member or to a supporting means therefor;
  attachment means, for attachment of a cover plate of said fitting, said cover plate shaped to neatly fit within said framing device; and
  a lip provided on the extremity of the framing device, such that, following installation, a layer of settable material is applied outside said framing device to the extremity of said lip to form a substantially smooth surface which is substantially flush with said cover plate of said fitting.

Preferably, said securement means is embodied in the form of a rim depending outwardly of said framing device about the orifice formed in said surface member.

Preferably, said rim is adapted to be attached to the outer surface of said surface member.

Preferably, said securement means is embodied in the form of a rim depending inwardly of said framing device to be secured to a supporting means within the orifice formed in the surface member.

Preferably, said securement means is embodied as a perforated, segmented, castellated, or like member.

Preferably, said settable material includes plaster, render, silicone, grout, corking compound, mastic compound or other settable material.

Preferably, said settable material has tiles, laminated material, or like bodies set therein.

In a further broad form, the present invention provides a support member for supporting a fitting in an orifice provided within a surface member, said support member being formed as a unitary member of complementary shape to surround the entire periphery of an orifice formed in said surface member, the support member including:
  a substantially planar rim portion which is perforated, segmented, castellated, or the like, and, which is adapted to be attached over a portion of said surface member about said orifice formed in said surface member;
  a lip extending outwards from an inner edge of said rim such that, following installation, a layer of settable material is applied over said rim portion to the extremity of said lip to form a surface finish over said rim which is of substantially flush appearance to the remainder of the surface member not covered by said rim; and,
  a flange depending substantially orthogonally from the outer extremity of said lip so as to fit within said orifice and thereby define an inner surface of said aperture which extends substantially orthogonally to said surface finish, said flange incorporating first attachment means for attachment of said fitting and second attachment means for attachment of said cover plate.

Preferably, wherein said second attachment means includes:
  locating means, provided on a surface of said flange, spaced from said extremity of said lip by a distance at least equivalent to the thickness of said cover plate, such that, when a portion of said rear surface of cover plate abuts on said locating means, said front surface of said cover plate is flush with, or recessed relative to, said surface finish of said surface member.

Also preferably, said locating means is embodied as a plurality of spaced apart protrusions to abut the rear surface of said cover plate.

Alternatively, but also preferably, said locating means is embodied as a protruding lip extending at least partly about said flange surface to abut the rear surface of said cover plate.

Also preferably, said attachment means further includes engagement means for releasably engaging said cover plate to said support member.

Preferably, said engagement means is embodied as a 'snap fit' engagement means.

Alternatively, but also preferably, said engagement means is embodied as a screw fit engagement means.

Also preferably, said rear surface of said cover plate is provided with at least one pair of engagement arms, one of each pair being provided on opposed edges of said cover plate, the extremities of each said engagement arms being adapted to be deformed for engagement behind an engagement catch associated with said flange of support member.

Preferably, said engagement catch is embodied as one or more protrusion(s) extending inwardly of said flange.

Preferably, said engagement catch is embodied as one or more orifice or indentation within the wall of said flange.

Also preferably, said cover plate is provided with one or more release orifice, within which a release tool may be provided to release said cover plate from said support member.

Preferably, to release said cover plate from said support member, said cover plate, being of resilient (bendable) material, is deflected such that said engagement means holding said cover plate to said support member is released.

Also preferably, said first attachment means includes at least one attachment surface member extending substantially orthogonally from an opposed end of said flange relative to said lip, for connection of said fitting thereto.

Preferably, said rim is shaped to fit within an orifice of any desired shape.

Preferably, said surface member is a plasterboard, plaster or rendered surface.

Also preferably, said settable material includes plaster, render or other filler material.

Preferably, said fitting is a switch, a power point, or like fitting.

Also preferably, said support member and/or said cover plate is formed of sheet metal material.

Preferably, said support member and/or said cover plate is formed of plastics material.

In a further broad form, the present invention provides a switch, power point or like device adapted to be provided within an orifice of a surface member, including a support member being formed as a unitary member of complementary shape to surround the entire periphery of an orifice formed in said surface member, said device including:
- a substantially planar rim portion adapted to be attached over a portion of said surface member about said orifice formed in said surface member, the rim portion being perforated, segmented, castellated or the like;
- a lip extending outwards from an inner edge of said rim, such that, following installation, a layer of settable material is provided over said rim to the extremity of said lip to form a surface finish over said rim which is of substantially flush appearance to the remainder of the surface member not covered by said rim, and;
- a flange depending substantially orthogonally from said lip in so as to fit substantially within said orifice and thereby define an inner surface of said aperture which extends substantially orthogonally to said surface finish;
- said device also including a cover plate adapted to be releasably attached to attachment means associated with said flange in a manner such that said cover plate is substantially aligned with or recessed within said aperture relative to said surface member;
- said device also including circuitry and/or electrical components normally associated with a switch, power point or like device housed within said support member behind said cover plate.

In yet a further broad form, the present invention provides a method of installing a recessed fitting in a surface member, including the steps of:
- cutting an orifice in said surface member;
- inserting and attaching a support member in said orifice, said support member being formed as a unitary member of complementary shape to surround the entire periphery of an orifice formed in said surface member, the support member including:
  - a substantially planar rim portion which is perforated, segmented, castellated, or the like, and which is adapted to be attached over a portion of said surface member about said orifice formed in said surface member;
  - a lip extending outwards from an inner edge of said rim such that, following installation, a layer of settable material is applied over said rim portion to the extremity of said lip to form a surface finish over said rim which is of substantially flush appearance to the remainder of the surface member not covered by said rim; and,
  - a flange depending substantially orthogonally from the outer extremity of said lip so as to fit within said orifice and thereby define an inner surface of said aperture which extends substantially orthogonally to said surface finish, said flange incorporating means for attachment of said fitting;

providing a layer of settable material over said rim to said lip to form a surface finish; and, attaching a cover plate to said attachment means of said flange, in a manner such that said cover plate is substantially aligned with or recessed relative to a surface finish of said surface member.

Preferably, said orifice is formed of any desired shape, and wherein an aperture member of corresponding shape is inserted within said orifice.

Also preferably, said surface member is plasterboard, plaster or a rendered surface, and wherein said settable material includes plaster, render or other fillable material.

Also preferably, said fitting is a switch, power point or like fitting.

BRIEF DESCRIPTION OF THE DRAWINGS

The present invention will become more fully understood from the following detailed description of a preferred but non-limiting embodiment thereof described in connection with the accompanying drawings, wherein:

FIG. 1 illustrates an elevational view of an installed switch or power point fitting in accordance with the present invention;

FIG. 2 illustrates, in FIGS. 2(*a*), 2(*b*) and 2(*c*), alternative configurations of the device of the present invention when adapted for installation with render or tiles, and, plasterboard, respectively;

DETAILED DESCRIPTION OF PREFERRED EMBODIMENTS

Throughout the drawings, like numerals will be used to identify similar features, except where expressly otherwise indicated.

As shown in the drawings, a framing device or support member, generally designated by the numeral 1, includes a securement means. In this example, the securement means is embodied as a substantially planar rim portion 2 which is perforated, segmented, castellated or the like, and which is adapted to be provided over a portion of a surface member 3 about an orifice 4 formed in the surface member 3. The device or member 1 further includes a lip 5, which extends outwardly from an inner edge of the rim 2, such that, following installation, a layer of settable material 6 is applied over the rim portion 2 to the extremity of the lip 5 to form of a surface finish over the rim 2 which is of substantially flush appearance to the remainder of the surface member 3 not covered by the rim. The rim 2 may be shaped to be of any desired shape, as desired. Also, any corners on the rim 2 may be rounded as shown by reference numeral 19, in FIG. 3. The support member further includes a flange 7 which depends substantially orthogonally from the outer extremity of the lip 5 so as to fit within the orifice 4 and thereby define an inner surface of the aperture which extends substantially orthogonal to the surface finish 6. The improvement and/or modification of the present invention is that the flange 7 incorporates means for attachment of the fitting 8, and means for attachment of a cover plate 9. The cover plate 9 may incorporate a switch 10, power point, or control panel, or may be a screen or face plate for a TV or video monitor, or, some other form of plate or panel wherein it is desired to have a flush surface with that of the surrounding surface.

The means for attachment of the fitting will vary according to the fitting to be attached. By way of example, a conventional commercially available switch or power point may be attached within the embodiment shown in FIG. 3 in a manner whereby the switch plate abuts blocks 33 below the protrusions 11. The fitting may be secured or clipped into position in any suitable manner.

Figure 3:
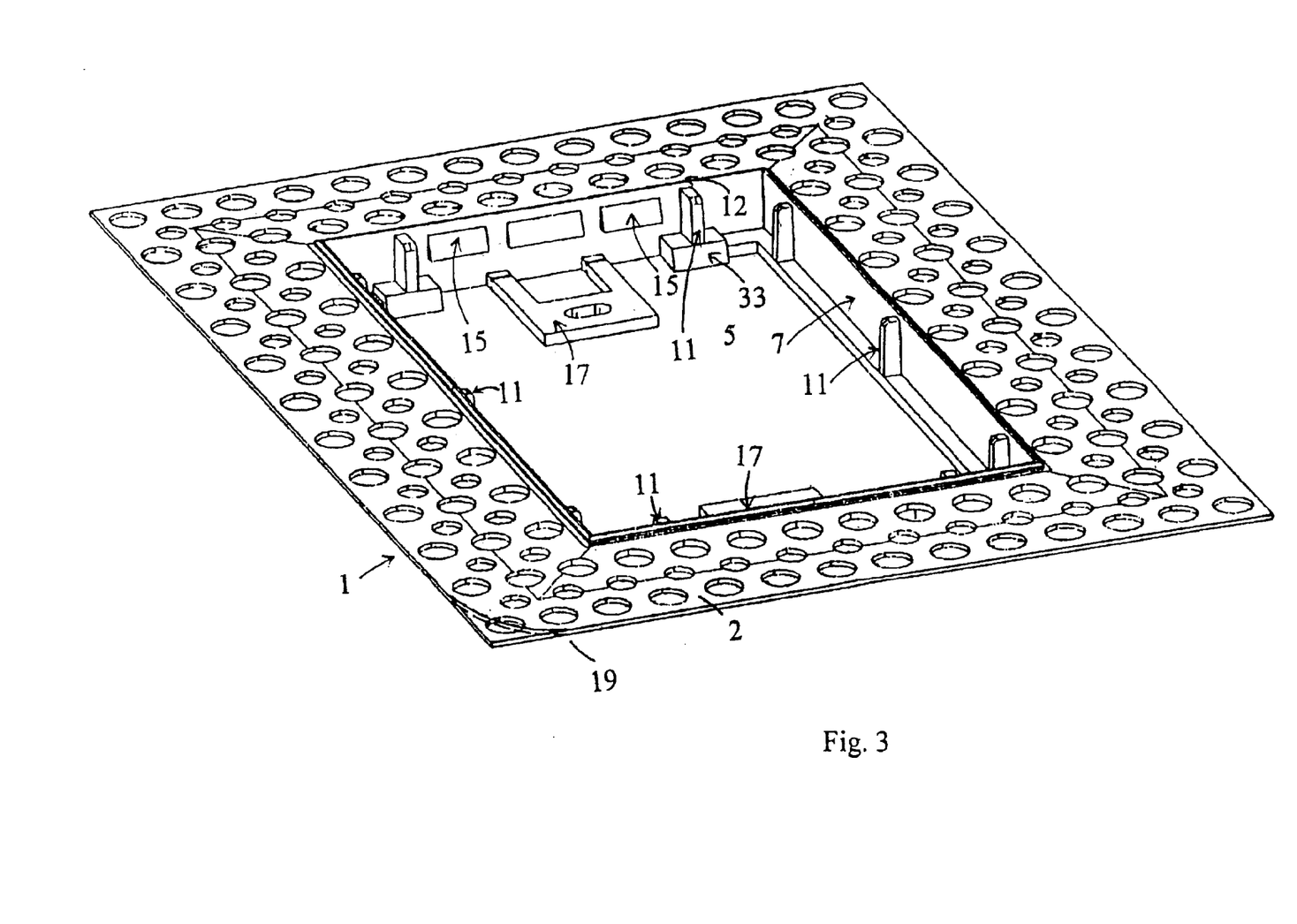
FIG. 3 illustrates a perspective view of the support member of the present invention.
Figure 4:
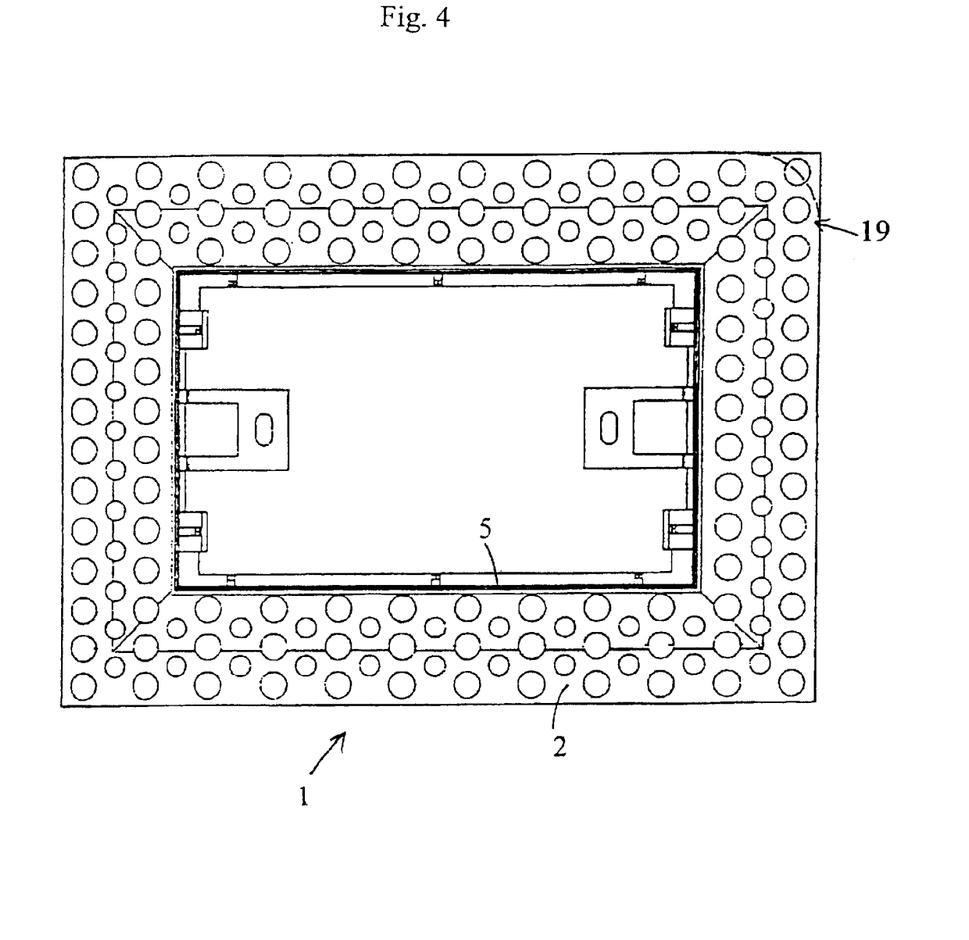
FIG. 4 illustrates a plan view of the device shown in FIG. 3.
Figure 5:
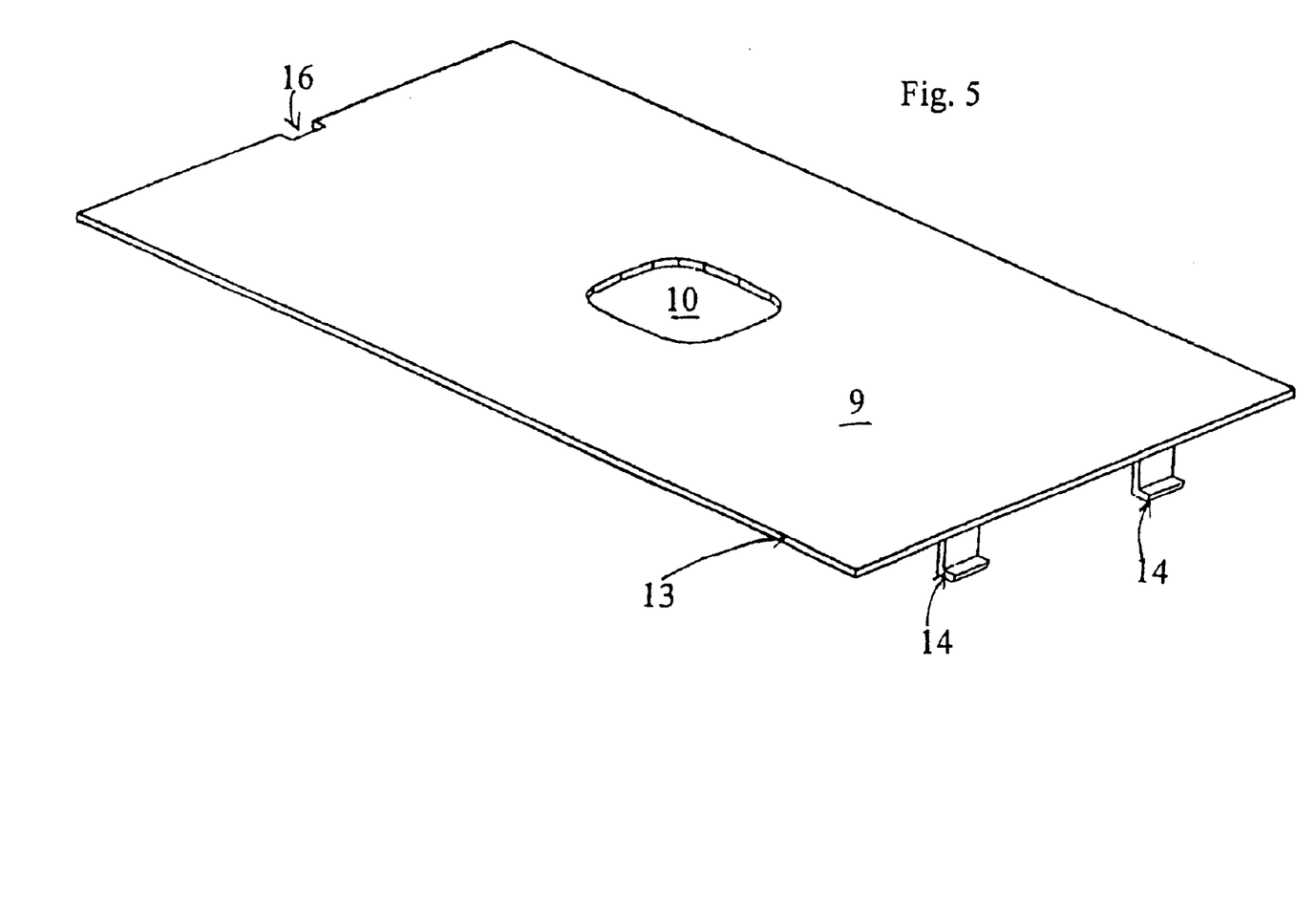
FIG. 5 illustrates a perspective view of the cover plate of the present invention; and, FIG. 6 illustrates a plan view of the cover plate of FIG. 5; and, FIG. 7 illustrates details of attachment of the device to a mounting member.
Figure 6:
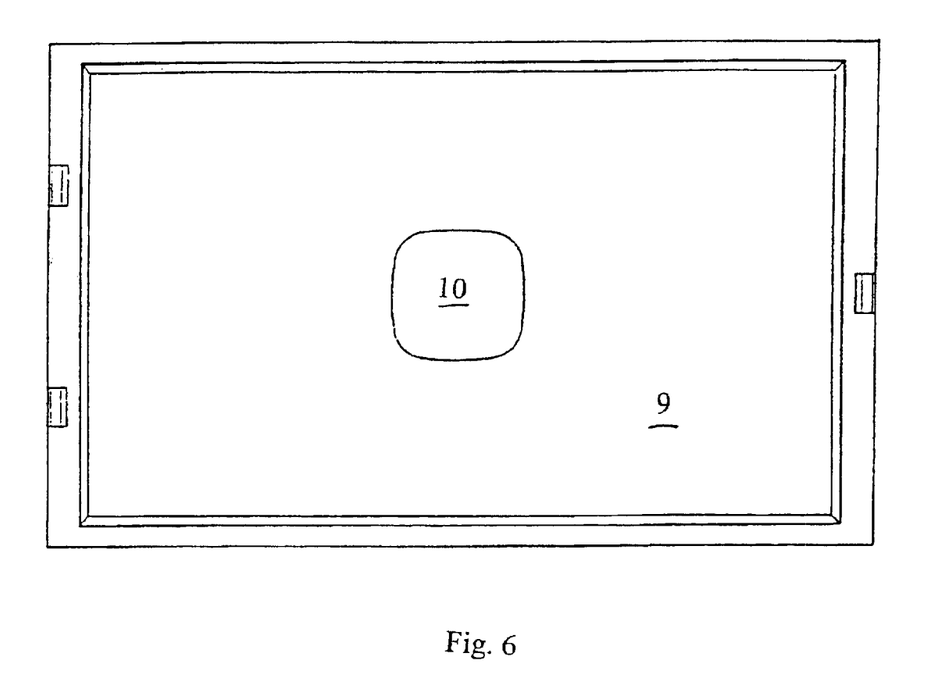

Further details of the support member will be seen in FIGS. 3 and 4, whilst further details of the cover plate 9 will be seen in FIGS. 5 and 6.

Figures 1, 2A, 2B:
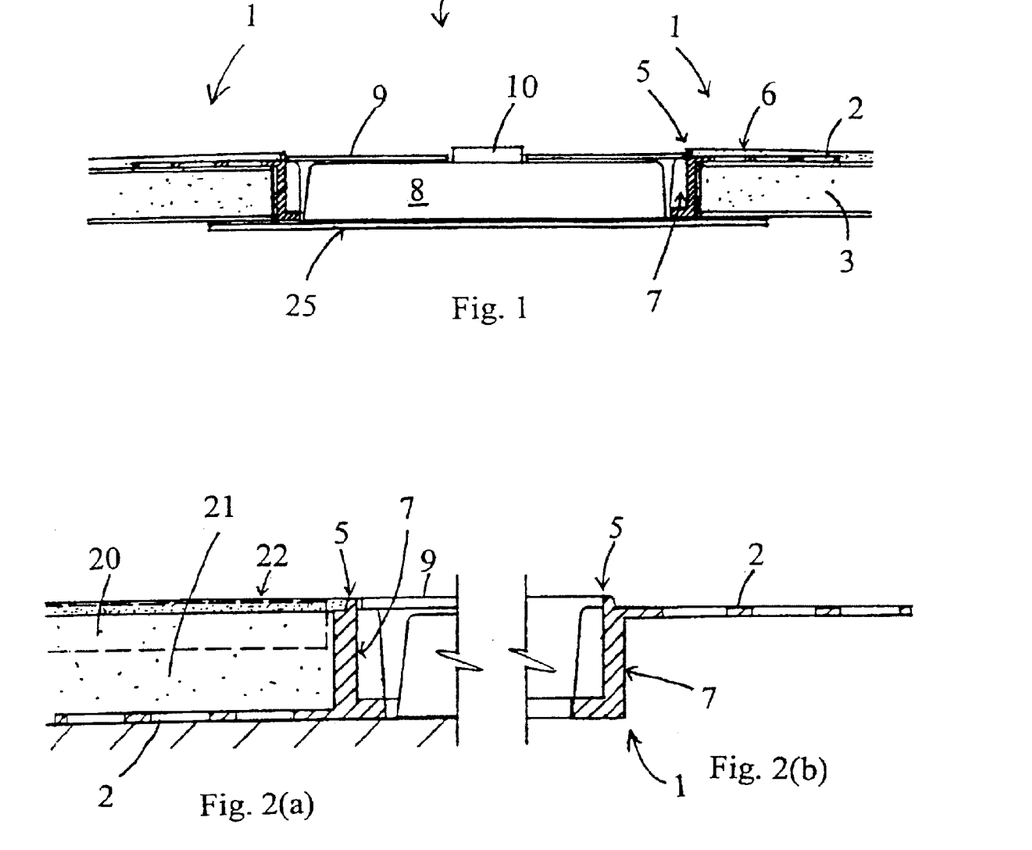

As seen in FIGS. 3 and 4, the support member includes means for attachment of the cover plate, shown in FIG. 3 as locating means 11. The locating means are provided on a surface of the flange 7, spaced a short distance 12 below the extremity of the lip 5, by a distance at least equivalent to the thickness 13 of the cover plate 9, such that, when a portion of the rear surface of the cover plate 9 abuts from the locating means 11, the front surface of the cover plate is flush with, or recessed relative to, the surface finish of the surface member as shown in FIG. 1. The locating means may be embodied as a plurality of spaced apart protrusions, as shown in FIG. 3, or, as will be understood by a person skilled in the art, as a lip or other like supporting means extending at least partly around the flange surface, again spaced at a distance 12 below the extremity of the lip 5. As such, the protrusions or the lip, will abut the rear surface of the cover plate 9.

Engagement means are preferably additionally provided to engage the cover plate to the support member, preferably in a releasable manner.

The embodiment illustrated in FIG. 3, read in conjunction with FIG. 5, shows the engagement means embodied as a "snap-fit" engagement means. This embodiment shows the rear surface of the cover plate 9 being provided with at least one pair of engagement arms 14, one of each pair being provided on opposed edges of the cover plate 9. The extremities of each of the engagement means are adapted to be deformed for engagement behind an engagement catch associated with the flange 7 of the support member I. As illustrated in FIG. 3, the engagement catch may be embodied as a protrusion 15 extending inwardly of the flange 5. Alternative configurations of engagement between the cover plate and the flange 7 may be embodied, such as, but not limited to, embodying the engagement catch as an orifice or indentation within the wall of the flange to thereby receive an engagement arm 14. Alternatively shaped engagement arms and engagement catches may be provided as will be clearly understood by persons skilled in the art. For example, an engagement arm 14 in the form of stalk with a shaped end to engage with a catch means of appropriate complementary shape, may alternatively be embodied. Likewise, alternative engagement means, using screws, rivets or other means may be utilised.

As also shown in FIGS. 5 and 6, a release orifice 16 is preferably provided within which a release tool (not shown) may be inserted to release the cover plate 9 from the support member I. To this effect, the cover plate is preferably constructed of a resilient (bendable) material such that it may be deflected so that the engagement means holding the cover plate to the support member may be released. This may be achieved by insertion of a screwdriver to wedge out the cover plate, or by another specialised tool. Alternative configurations or releasing the cover plate 9 from the support member 9 will also be understood to be made. For example, the cover plate 9 may not be provided with an orifice 16, but, in order to release the cover plate, it may be pushed or otherwise moved to disengage it from the support member 1. That is, for example, an appropriate release mechanism, such as a spring biased locking mechanism, whereby the locating means are provided with a biased but moveable (by pushing) support means may be alternatively provided.

The support member 1 is further provided with an attachment means for attachment of the fitting thereto. For example, the light switch or power point components may be provided in a conventional format and then secured to the attachment means 1, as shown in FIG. 3, the attachment means being illustrated as a surface member extending substantially orthogonally from the opposed ends of the flange, at the opposite end to the lip 5. It will be appreciated that the light switch or other fitting may be formed integrally with the support member, such that it is a unitary constructed piece, rather than having to be thereafter physically secured one to the other.

It will be appreciated that the support member of the present invention may be shaped such that it fits within an orifice of any desired shape. The orifice is preferably provided in a surface member which is formed of plasterboard, plaster or a rendered surface, and a settable material is therefore preferably plaster, render, silicone, grout, corking board, mastic compound, or other fillable material. The settable material may of course include solid materials set therein, such as tiles, timber or laminated materials.

In FIG. 2(*a*) is illustrated an alternatively preferred embodiment of the invention, useful with tile or render surface finishes. As shown, in this embodiment, the perforated flange 2 is, in this embodiment provided substantially rearwardly from the lip 5 atop the flange 7 such that a settable material, for example render or grout 21, optionally with tiles 20 or like solid articles set therein, may combine to form the finished surface 22 with which the cover plate 9 is then flush thereto.

Figure 2C:
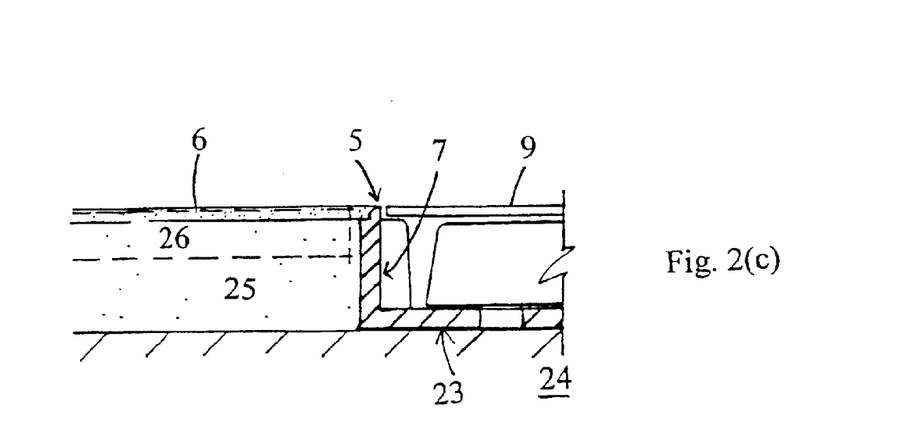

Yet a further alternative modification is shown in FIG. 2(*c*), wherein the perforated flange 2 is replaced by a securement means embodied as a flange 23, which extends in the opposite direction to flange 2 in the embodiments shown in FIGS. 2(*a*) and 2(*b*). The flange 23 is optionally perforated, and is secured to a frame member or other support 24. In this embodiment, settable material 25, optionally with a tile 26 or the like is supplied such that the top surface thereof 6 is provided to the lip 5, the top surface of the settable material 6 being again flush with the cover plate 9, in accordance with the invention.

Figure 7A:
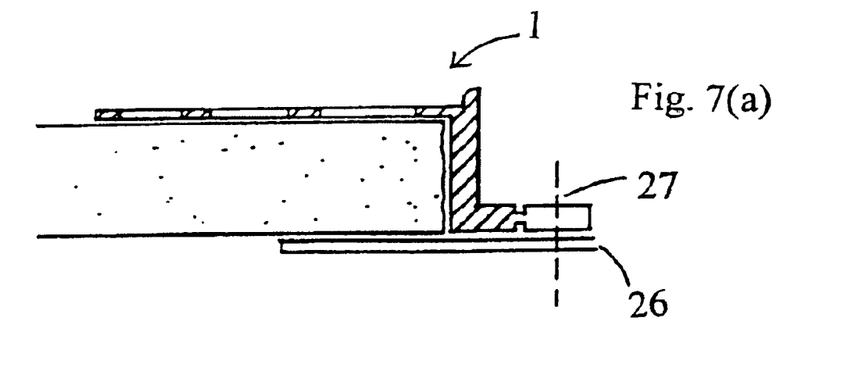
Figure 7B:
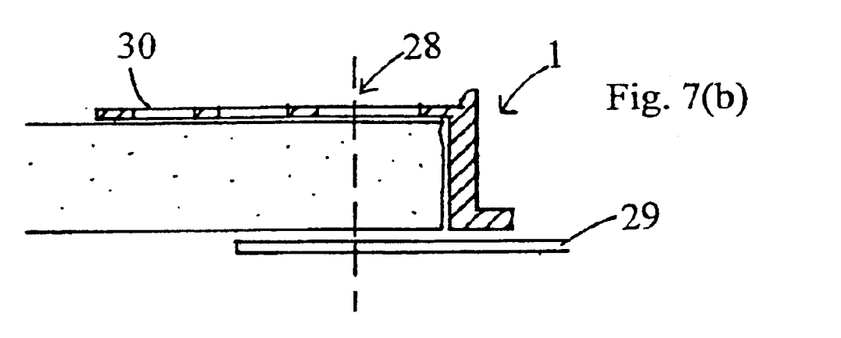
Figure 7C:
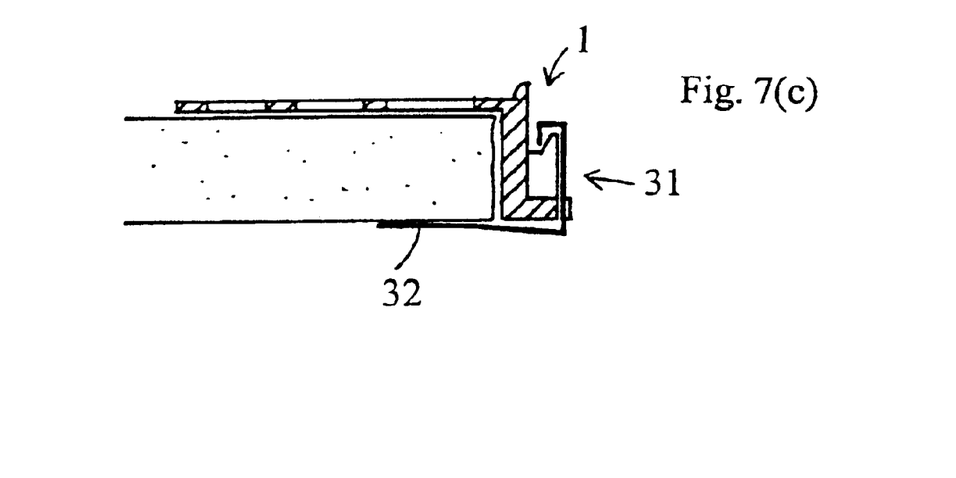

In FIG. 7 are shown various mounting systems whereby the device 1 may be mounted to an appropriate support, such as a wall bracket or the like. Whilst FIG. 1, by reference number 25 and FIG. 3, by reference numeral 17 show various embodiments of mounting brackets, FIG. 7, in FIGS. 7(a), 7(b) and 7(c), detail various arrangements. FIG. 7(a) shows how the device 1 may be mounted by screws 27 or other means to a standard mounting bracket or box for a timber frame 26 or render. FIG. 7(b) shows an alternative system whereby a screw or clip 28 may be fixed through the face of the perforated member 30 to the mounting member 29, whilst FIG. 7(c) illustrated an exemplary embodiment of a customised clipping arrangement 31. It will be appreciated that numerous other clipping arrangements may be utilised, and then should be considered to fall within the scope of the invention.

In its most preferred form, as previously described, the fitting is a switch, a power point or other like fitting. Other adaptations of the present invention will be become readily apparent by persons skilled in the art, and such adaptation, should be considered to fall within the spirit and scope of the present invention.

It will be appreciated that the components of the present invention may be constructed of a variety of materials, such as metal or plastics material. This includes both the support member and the cover plate.

It will be appreciated that the components may be fabricated in separate units, or, alternatively, various of the components hereinbefore described may be constructed as unitary members. For example, in the embodiment of a switch or a power point, the circuitry and/or electrical component connections, and the mechanical switching means may be fabricated as single unit with the support member, such that, once installed and appropriately electrically connected, the cover plate is simply attached thereto after supply of the settable material thereover.

It will be appreciated that the method of installation of the device of the present invention is significantly improved from conventional methods of installation of power points, light switch fittings and like devices. The method involves the initial formation of an orifice in a surface member and then the installation and attachment of the support member within the orifice whereby the rim portion is attached over a portion of the surface member about the orifice, then a layer of settable material or tiles (not settable material) can be provided over the rim to the lip such that a surface finish without interruption is then provided over the surface member and over the rim portion to the extremity of the lip. Any necessary switching components and circuitry components are then provided within the support member and the cover plate is provided over the support member such that the cover plate is substantially aligned with or recessed relative to the surface finish of the surface member.

The present invention has been hereinbefore described with reference to a particular embodiment only. It will, however, be understood by persons skilled in the art that numerous variations and modifications can be made to the invention. All such variations and modifications should be considered to fall within the spirit and scope of the invention as broadly hereinbefore described and as hereinafter claimed.

What is claimed is:

1. A support member for supporting a fitting and a cover plate in an orifice provided within a surface member, said support member being formed as a unitary member of complementary shape to surround the entire periphery of an orifice formed in said surface member, the support member including:

a substantially planar rim portion which is one of the group consisting of perforated, segmented, and castellated, and, which is adapted to be attached over a portion of said surface member about said orifice formed in said surface member;

a lip extending outwards from an inner edge of said rim such that, following installation, a layer of settable material is applied over said rim portion to the extremity of said lip to form a surface finish over said rim which is of substantially flush appearance to the remainder of the surface member not covered by said rim; and, a flange depending substantially orthogonally from the outer extremity of said lip so as to fit within said orifice and thereby define an inner surface of said aperture which extends substantially orthogonally to said surface finish, said flange incorporating means for attachment of said fitting and means for attachment of said cover plate.

2. A support member as claimed in claim 1, wherein said means for attachment of said cover plate means includes:

locating means, provided on a surface of said flange, spaced from said extremity of said lip by a distance at least equivalent to the thickness of said cover plate, such that, when a portion of said rear surface of cover plate abuts on said locating means, said front surface of said cover plate is flush with or recessed relative to said surface finish of said surface member.

3. A support member as claimed in claim 2, wherein said locating means is embodied as a plurality of spaced apart protrusions to abut the rear surface of said cover plate.

4. A support member as claimed in claim 2, wherein said locating means is embodied as a protruding lip extending at least partly about said flange surface to abut the rear surface of said cover plate.

5. A support member as claimed in claim 2, wherein said attachment means further includes:

engagement means for releasably engaging said cover plate to said support member.

6. A support member as claimed in claim 5, wherein said engagement means is embodied as a 'snap fit' engagement means.

7. A support member as claimed in claim 6, wherein said rear surface of said cover plate is provided with at least one pair of engagement arms, one of each pair being provided on opposed edges of said cover plate, the extremities of each said engagement arms being adapted to be deformed for engagement behind an engagement catch associated with said flange of support member.

8. A support member as claimed in claim 7, wherein each said engagement catch is embodied as a protrusion extending inwardly of said flange.

9. A support member as claimed in claim 7, wherein each said engagement catch is embodied as an orifice or indentation within the wall of said flange.

10. A support member as claimed in claim 1, wherein said cover plate is provided with a release orifice, wherein a release tool may be is inserted into said release orifice to release said cover plate from said support member.

11. A support member as claimed in claim 10, wherein, to release said cover plate from said support member, said cover plate, being of resilient (bendable) material, is deflected such that said engagement means holding said cover plate to said support member is released.

12. A support member as claimed in claim 1, wherein said first attachment means includes at least one attachment surface member extending substantially orthogonally from an opposed end of said flange relative to said lip, for connection of said fitting thereto.

13. A support member as claimed in claim 1, wherein said rim is shaped to fit within an orifice of any desired shape.

14. A support member as claimed in claim 1, wherein said surface member is a plasterboard, plaster or rendered surface.

15. A support member as claimed in claim 1, wherein said settable material includes plaster, render or other filler material.

16. A support member as claimed in claim 1, wherein said fitting is a switch, a power point, control panel, face plate of a TV or video monitor or like fitting.

17. A support member as claimed in claim 1, wherein at least one of said support member and said insert cover plate is formed of sheet metal material.

18. A support member as claimed in claim 1, wherein at least one of said support member and said insert cover plate is formed of plastics material.

19. A switch, power point or like device adapted to be provided within an orifice of a surface member, including a support member being formed as a unitary member of complementary shape to surround the entire periphery of an orifice formed in said surface member, said device including:

a substantially planar rim portion adapted to be attached over a portion of said surface member about said orifice formed in said surface member, the rim portion being one of the group consisting of perforated, segmented, and castellated;

a lip extending outwards from an inner edge of said rim, such that, following installation, a layer of settable material is provided over said rim to the extremity of said lip to form a surface finish over said rim which is of substantially flush appearance to the remainder of the surface member not covered by said rim, and;

a flange depending substantially orthogonally from said lip in so as to fit substantially within said orifice and thereby define an inner surface of said aperture which extends substantially orthogonally to said surface finish;

said device also including a cover plate adapted to be releasably attached to attachment means associated with said flange in a manner such that said cover plate is substantially aligned with or recessed within said aperture relative to said surface member;

said device also including electrical components normally associated with a switch, power point or like device housed within said support member behind said cover plate.

20. A method of installing a recessed fitting in a surface member, including the steps of:

cutting an orifice in said surface member;

inserting and attaching a support member in said orifice, said support member being formed as a unitary member of complementary shape to surround the entire periphery of an orifice formed in said surface member, the support member including:

a substantially planar rim portion which is one of the group consisting of perforated, segmented and castellated, and, which is adapted to be attached over a portion of said surface member about said orifice formed in said surface member;

a lip extending outwards from an inner edge of said rim such that, following installation, a layer of settable material is applied over said rim portion to the extremity of said lip to form a surface finish over said rim which is of substantially flush appearance to the remainder of the surface member not covered by said rim; and, a flange depending substantially orthogonally from the outer extremity of said lip so as to fit within said orifice and thereby define an inner surface of said aperture which extends substantially orthogonally to said surface finish, said flange incorporating means for attachment of said fitting;

providing a layer of settable material over said rim to said lip to form a surface finish; and, attaching a cover plate to said attachment means of said flange, in a manner such that said cover plate is substantially aligned with or recessed relative to a surface finish of said surface member.

21. A method of installing a recessed fitting in a surface member as claimed in claim 20, wherein said orifice is formed of any desired shape, and wherein an aperture member of corresponding shape is inserted within said orifice.

22. A method of installing a recessed fitting in a surface member as claimed in claim 20, wherein said surface member is plasterboard, plaster or a rendered surface, and wherein said settable material includes plaster, render or other fillable material.

23. A method of installing a recessed fitting in a surface member as claimed in claim 20, characterised in that said fitting is a switch, power point or like fitting.

* * * * *